(12) United States Patent
Ait-Ameur et al.

(10) Patent No.: US 9,374,725 B2
(45) Date of Patent: Jun. 21, 2016

(54) GENERIC INTERFACE FOR WIRELESS CELLULAR NETWORKS

(75) Inventors: Samir Ait-Ameur, Fremont, CA (US); Benjamin J. Parker, Vacaville, CA (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 167 days.

(21) Appl. No.: 13/195,674

(22) Filed: Aug. 1, 2011

(65) Prior Publication Data

US 2013/0035092 A1 Feb. 7, 2013

(51) Int. Cl.
*H04M 1/00* (2006.01)
*H04W 24/08* (2009.01)
*H04W 92/04* (2009.01)

(52) U.S. Cl.
CPC .............. *H04W 24/08* (2013.01); *H04W 92/04* (2013.01)

(58) Field of Classification Search
USPC ........................ 455/405, 423–425, 448, 552.1
See application file for complete search history.

(56) References Cited

U.S. PATENT DOCUMENTS

| | | | |
|---|---|---|---|
| 2005/0060532 A1* | 3/2005 | Dorenbosch | H04M 1/72563 713/100 |
| 2010/0016013 A1* | 1/2010 | Kabashima | H04W 88/00 455/552.1 |
| 2012/0166618 A1* | 6/2012 | Dahod | H04L 47/20 709/224 |
| 2012/0182978 A1* | 7/2012 | Masputra | H04L 45/026 370/338 |
| 2012/0300639 A1* | 11/2012 | Janakiraman | H04L 41/12 370/241 |
| 2012/0311457 A1* | 12/2012 | O'Gorman | G06F 3/048 715/740 |

* cited by examiner

*Primary Examiner* — Olumide T Ajibade Akonai
*Assistant Examiner* — Matthew Genack (57) ABSTRACT

A generic interface may be provided for parameters relating to one or more wireless networks. In one implementation, a method may include monitoring parameters relating to a 3G wireless network and a 4G wireless network. The method may also include receiving a request, from a network element, to create a custom interface for the parameters relating to the 3G wireless network and the 4G wireless network, the request including an indication of a subset of the parameters that are to be included in the custom interface. The method may further include providing the custom interface to the network element in order to provide the subset of the parameters to the network element.

17 Claims, 7 Drawing Sheets

GENERIC INTERFACE FOR WIRELESS CELLULAR NETWORKS

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

An operator of a wireless network, such as a cellular network, may simultaneously operate a number of different wireless network technologies, such as a Third Generation (3G) cellular access network and a Fourth Generation (4G) cellular access network. Some mobile devices, such as smart phones, may include logic to connect to the network through multiple different radio interfaces. In this situation, the mobile device may connect to the wireless network using the best available wireless access technology (e.g., 4G when it is available). Other mobile devices may include logic to connect to a single wireless access technology, such as a mobile device that can connect only to a 3G network. In either situation, the operator of the wireless network may wish to share parameters relating to network interfaces (i.e., the radio interfaces).

DETAILED DESCRIPTION OF PREFERRED EMBODIMENTS

The following detailed description refers to the accompanying drawings. The same reference numbers in different drawings may identify the same or similar elements.

Techniques described herein may relate to provision of a generic interface for one or more wireless networks. The generic interface may aggregate parameters, from a number of network devices, in the wireless networks. A second network device, such as one that performs analysis functions relating to the networks, may receive a customized set of parameters from the generic interface.

Figure 1:
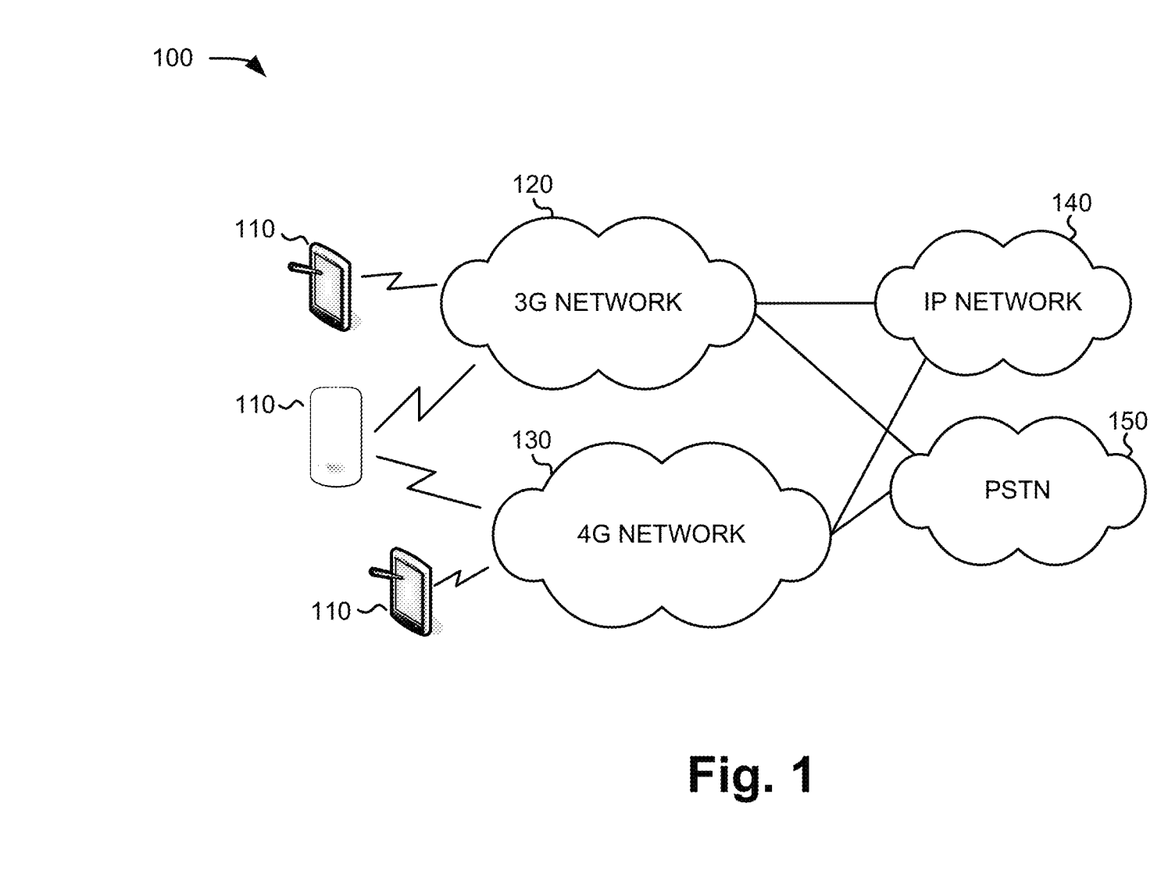
FIG. 1 is a diagram of an example environment in which systems and/or methods described herein may be implemented.

FIG. 1 is a diagram of an example environment 100 in which systems and/or methods described herein may be implemented. As illustrated, environment 100 may include mobile devices 110, a 3G access network 120, a 4G access network 130, an Internet Protocol (IP) network 140, and a public switched telephone network (PSTN) 150. Components of environment 100 may interconnect via wired and/or wireless connections or links.

Mobile devices 110 may include portable computing and communication devices, such as a personal digital assistant (PDA), a smart phone, a cellular phone, a tablet computer, a laptop computer with integrated connectivity to a cellular wireless network, etc. Mobile devices 110 may wirelessly connect to 3G network 120 and/or 4G network 130.

Networks 120 and 130 may generally include logic to provide wireless access for mobile devices 110. Through these networks, mobile devices 110 may, for instance, communicate with one another (e.g., via a voice call), access services through IP network 140, and/or complete telephone calls through a traditional telephone network such as PSTN 150.

Network 120 may be a network that provides a wireless (radio) interface to mobile devices 110 using the $3^{rd}$ generation (3G) mobile telecommunications standards. An implementation of 3G network 120 may include one or more elements through which mobile devices 110 may wirelessly connect to receive telecommunication services. Network 130 may be a network that provides a wireless (radio) interface to mobile devices 110 using the $4^{th}$ generation (4G) mobile telecommunications standards. An implementation of 4G network 130 may include one or more elements through which mobile devices 110 may wirelessly connect to receive telecommunication services. Additional details relating to network elements in 3G/4G networks 120/130 will be discussed in more detail below.

Networks 120 and 130 may connect to one or more additional networks, such as IP network 140 and PSTN 150. IP network 140 may include public or private (or both) IP network(s). IP network 140 may be, for example, a packet-based wide area network. In one implementation, IP network 140 may be used to implement an IP multimedia subsystem (IMS) architecture. IMS is an architectural framework for delivering IP multimedia services. In some implementations, IP network 140 may connect to additional networks. For instance, network 130 may connect to a private network and a public network, such as the Internet.

PSTN 150 may include network transmission devices, inter-connected by switching centers, that allow telephone devices to communicate with one another. PSTN 150 may include traditional telephone lines, fiber optic cables, microwave transmission links, communication satellites, and/or undersea telephone cables, connected by switching centers. Telephone calls originated by or destined to mobile devices 110 may be completed to other devices via PSTN 150.

Figure 2:
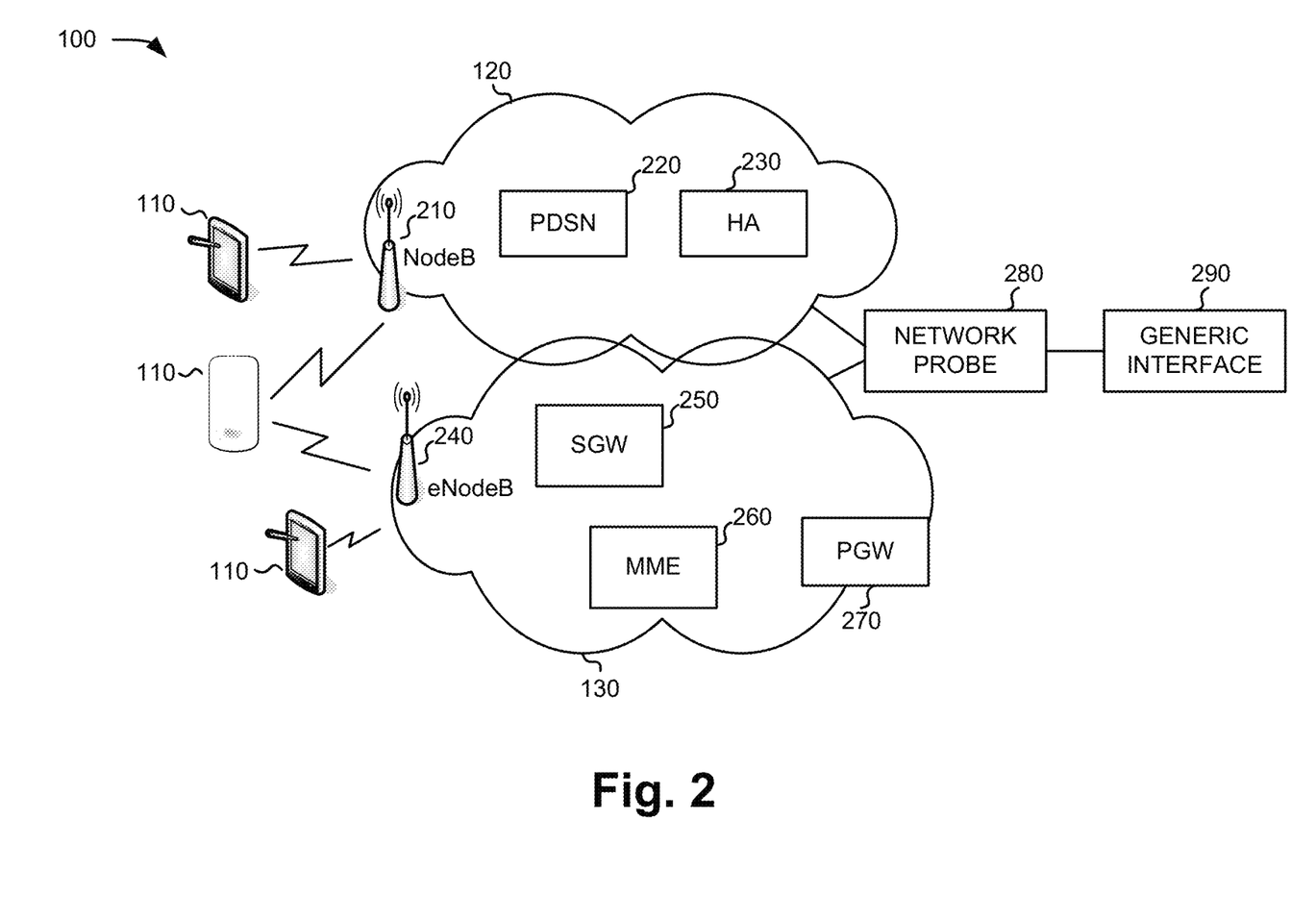
FIG. 2 is a diagram illustrating another view of environment.

FIG. 2 is a diagram illustrating another view of environment 100, in which 3G network 120 and 4G network 130 are shown in more detail. As illustrated, 3G network 120, of environment 100, may include a base station (NodeB) 210, a packet data serving node (PDSN) 220, and a home agent (HA) 230. 4G network 130, of environment 100, may include a base station (eNodeB) 240, a serving gateway (SGW) 250, a mobility management entity (MME) 260, and a packet data network gateway (PGW) 270. A network probe 280 may connect to various network elements, in 3G network 120 and 4G network 130, to gather information relating to mobile devices 110 and/or networks 120/130. Generic interface component 290 may receive the information gathered by network probe 280 and provide the information to other network elements.

Base station 210 may include wireless transceiver components that may cover a particular geographic area (a "cell")

serviced by 3G network 120. Base station 210 may thus provide the air interface (e.g., the radio interface) between 3G network 120 and mobile devices 110.

PDSN 220 may support packet data services, for mobile devices 110, through 3G network 120. PDSN 220 may operate to, for example: establish, maintain and terminate point-to-point (PPP) sessions with mobile device 110; support mobile IP packet services; initiate authentication, authorization, and accounting (AAA) functions; and collect usage data.

HA 230 may store information about mobile devices 110, such as a current IP address. For example, HA 230 may store information for mobile devices 110 that have a permanent home address in 3G network 120. HA 230 may additionally perform routing functions for the tunneling of data to mobile device 110 when mobile device 110 is connected to a network that is not the home network of mobile device 110.

Base station 240 may include wireless transceiver components that may cover a particular geographic area (a "cell") serviced by 4G network 130. Base station 240 may thus provide the air interface (e.g., the radio interface) between 4G network 140 and mobile devices 110.

SGW 250 may route and forward user data packets for mobile devices 110. Additionally, SGW 250 may terminate the data path and trigger paging when data arrives for mobile devices. SGW 250 may additionally perform other functions, such as the management and storing of mobile device 110 contexts (e.g. parameters of the IP bearer service and network internal routing information).

MME 260 may act as a control node for 4G network 130. MME 260 may be responsible for idle mode tracking of mobile devices 110. MME 260 may function in the network bearer activation/deactivation process and may also be responsible for choosing a SGW 250 for a mobile device 110 when the mobile device comes online. MME 260 may also be responsible for authenticating the user of mobile device 110.

PGW 270 may provide connectivity to external networks, such as IP network 140. A mobile device 110 may have simultaneous connectivity with more than one PGW to multiple additional networks. PGW 270 may perform, for example, policy enforcement, packet filtering for each user, charging support, lawful interception, and packet screening.

Network probe 280 may gather information relating to mobile devices 110 and/or networks 120/130. For instance, 3G network 120 and 4G network 130 (or the devices in these networks) may be associated with interfaces through which parameters relating to mobile devices 110 and/or the network may be exchanged. Network probe 280 may connect to a number of interfaces to obtain a number of parameters relating to a mobile device 110 and/or to networks 120/130.

Generic interface component 290 may receive the parameters obtained by network probe 280. Generic interface component 290 may store and provide the parameters to other requesting devices, such as network elements within or external to 3G network 120 and 4G network 130. The parameters may be provided as a generic interface that may be accessible by a number of different network elements. Further, because the parameters stored by generic interface component 290 may be aggregated from a number of different interfaces within 3G network 120 and 4G network 130, generic interface component 290 may act as a single entity from which different network elements may view the state of mobile devices 110 and/or networks 120/130. The network elements that may access the parameters stored by generic interface component 290 may include, for example, content distribution platforms, devices that perform network optimization, and/or devices that perform network analysis.

Although illustrated, in FIG. 2, as being outside of 3G network 120 and 4G network 130, in practice, network probe 280 and or generic interface component 290 may be located within 3G network 120, 4G network 130, or within another network, such as IP network 140. In some implementations, the functions of network probe 280 and generic interface component 290 may be combined and performed by a single component.

Although FIGS. 1 and 2 show example components of environment 100, in other implementations, environment 100 may contain fewer components, different components, differently arranged components, or additional components than depicted in FIGS. 1 and 2. Alternatively, or additionally, one or more components of environment 100 may perform one or more tasks described as being performed by one or more other components of environment 100.

Figure 3:
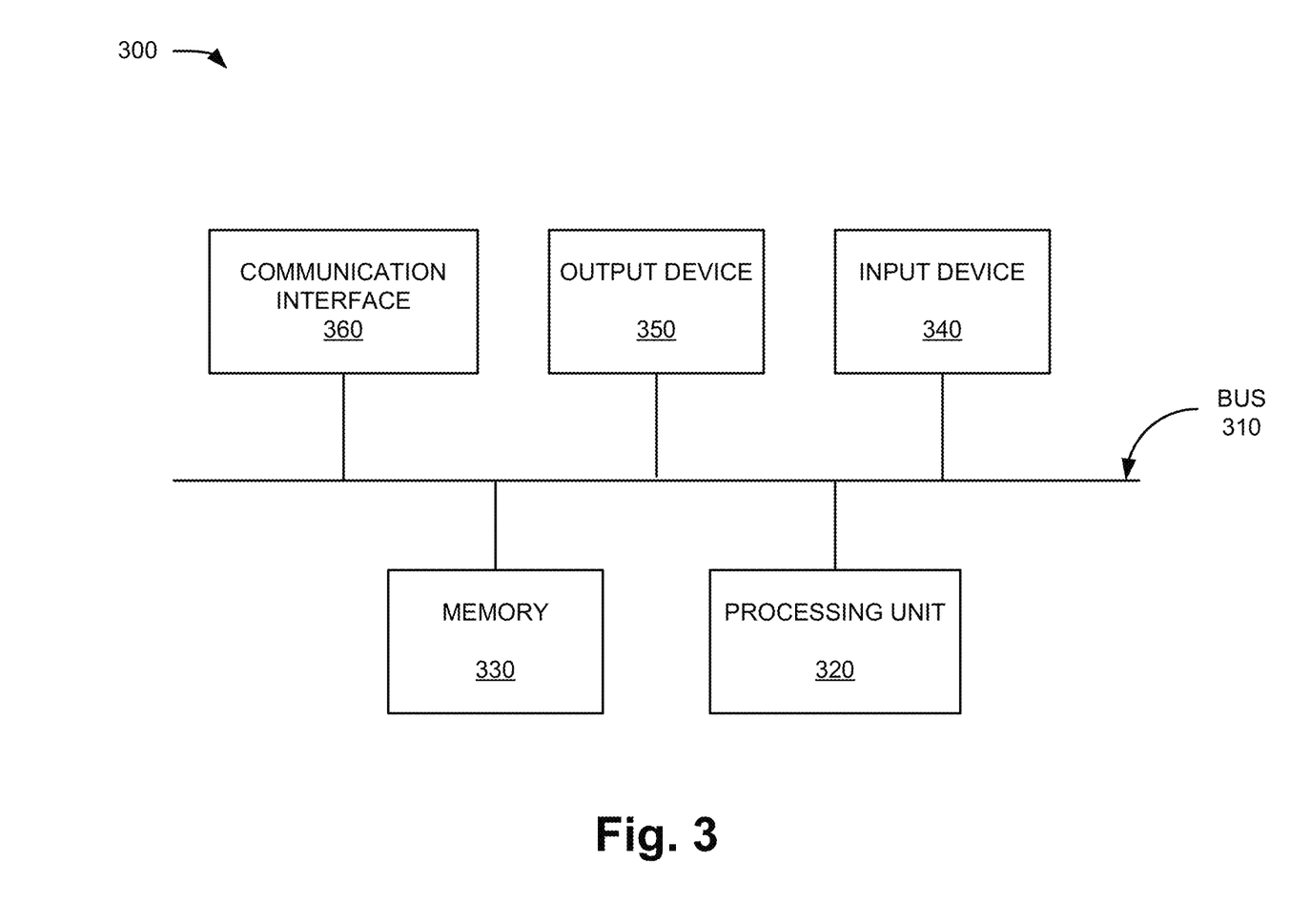
FIG. 3 is a diagram of example components of a device that may correspond to one of the components shown in the environment of FIGS. 1 and 2.

FIG. 3 is a diagram of example components of a device 300 that may correspond to one of the components shown in environment 100, such as mobile device 110, PDSN 220, HA 230, SGW 250, MME 260, PGW 270, network probe 280, and/or generic interface component 290. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. Additionally or alternatively, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include a radio transceiver.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

Figure 4:
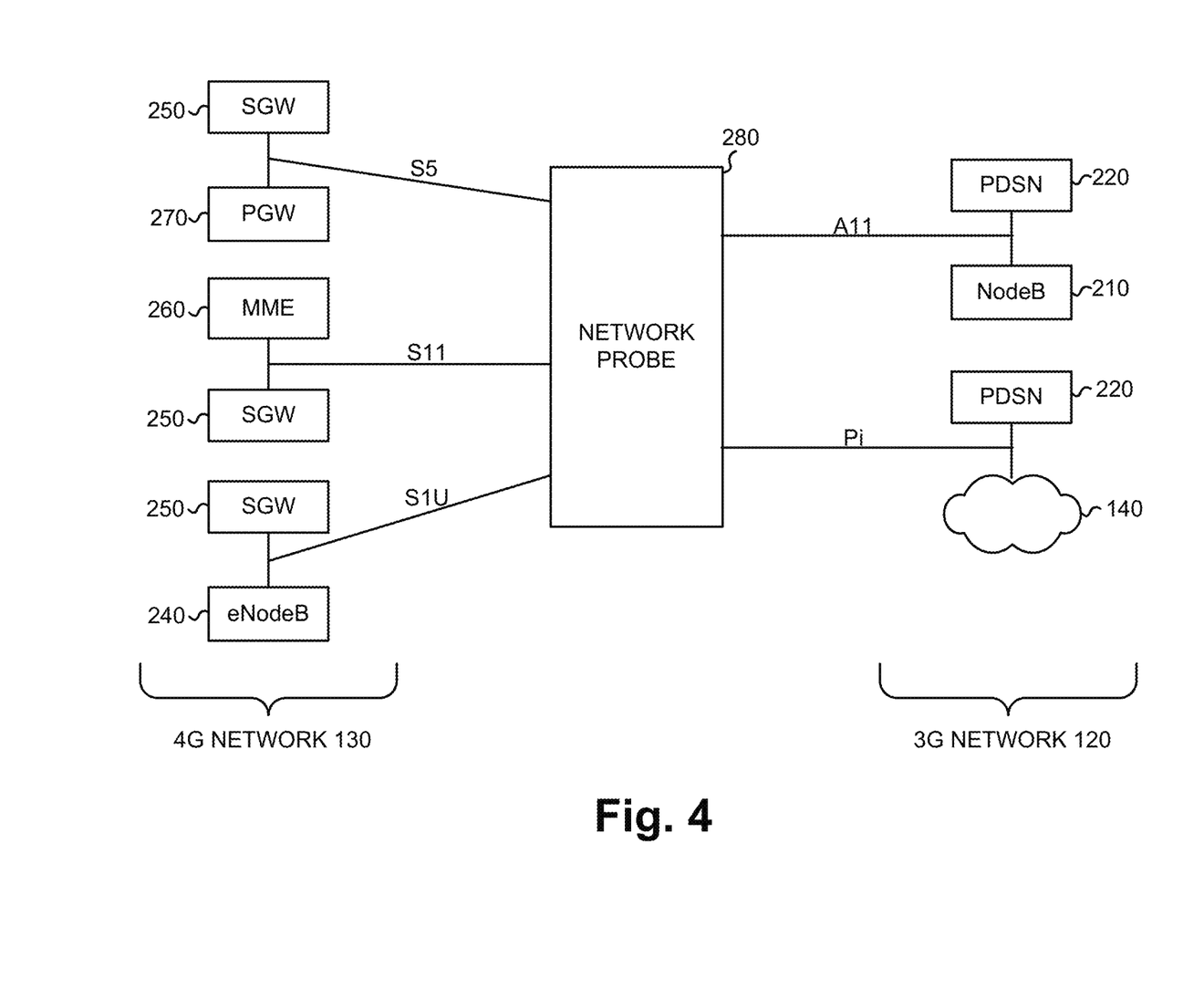
FIG. 4 is a diagram illustrating interfaces that may be monitored by a network probe.

FIG. 4 is a diagram illustrating interfaces that may be monitored by network probe 280. In general, each interface may refer to the protocols and/or transport technologies used to communicate between different network elements in 3G/4G networks 120/130. Network probe 280 may determine or monitor one or more parameters from each interface.

As shown in FIG. 4, an example set of interfaces that may be monitored for 4G network 130 may include: the S5 interface between SGW 250 and PGW 270, the S11 interface between SGW 250 and MME 260, and the S1U interface between SGW 250 and eNodeB 240. The S5 interface may be an IP interface between SGW 250 and PGW 270, and may include parameters relating to user plane tunneling and tunnel management. The S11 interface may be an IP interface between SGW 250 and MME 260 and may be used to obtain the MME, SGW, and PGW associated with a mobile device 110. The S1U interface may be a user plane interface and may be used to obtain identification information for a mobile device 110.

As is further shown in FIG. 4, an example set of interfaces that may be monitored for 3G network 120 may include: the A11 interface between NodeB 210 and PDSN 220, and the Pi interface between PDSN 220 and IP network 140. The A11 interface may generally provide information relating to packet flow details and historical performance information. The Pi interface may provide information relating to traffic details for certain services, web browsing usage statistics, and email usage statistics.

In alternative implementations, interfaces other than or in addition to those shown in FIG. 4 may be monitored by network probe 280.

Network probe 280, when monitoring interfaces, such as those shown in FIG. 4, may obtain a number of parameters relating to mobile devices 110 and/or networks 120/130. Table I, below, lists an example set of fields, where refer to the parameters, and the possible interfaces from which each parameter may be obtained.

TABLE I

| PARAMETER/FIELD NAME | INTERFACE DRAWN FROM |
| --- | --- |
| MDN | A11 and S1U |
| IMSI | S1U |
| IMEI | S1U |
| Time Stamp | A11 and S1U |
| Start | Pi and S5 |
| Stop | Pi and S5 |
| Device IP Address | A11, S1U, S5, S11, and Pi |
| Protocol Type | A11, S1U, S5, S11, and Pi |
| Protocol Name | A11, S1U, S5, S11, and Pi |
| Device Dormancy Status | A11, S1U, S5, S11, and Pi |
| Dormancy Time | A11, S1U, S5, S11, and Pi |
| Protocol Transport Type | A11, S1U, S5, S11, and Pi |
| Cell Site Type | A11, S1U, S5, S11, and Pi |
| Cell Site Sectors | A11, S1U, S5, S11, and Pi |
| Cell Site Sector Status | A11, S1U, S5, S11, and Pi |
| Frequency Carrier | A11, S1U, S5, S11, and Pi |
| Congestion Level | A11, S1U, S5, S11, and Pi |
| HA | Pi |
| PDSN | Pi |
| MME | S5 and S11 |
| SGW | S5 and S11 |
| PGW | S5 and S11 |

TABLE I-continued

| PARAMETER/FIELD NAME | INTERFACE DRAWN FROM |
| --- | --- |
| Other NEs | |
| Open Field Type 1 | |
| Open Field Type 2 | |
| Open Field Type 3 | |
| Open Field Type 4 | |
| Open Field Type 5 | |
| Open Field Type 6 | |
| Open Field Type 7 | |
| Open Field Type 8 | |
| Open Field Type 9 | |
| Open Field Type 10 | |

As shown in Table I, the Mobile Device Number (MDN) may be obtained from the A11 and S1U interfaces, the International Mobile Subscriber Identity (IMSI) of a mobile device 110 may be obtained from the S1U interface, and the International Mobile Equipment Identity (IMEI) number may also be obtained from the S1U interface. A time value (Time Stamp) relating to communications of a mobile device 110 between the base station and an SGW 250 (4G) or PDSN (3G) may be obtained from the A11 interface (3G) or the S1U (4G) interface. Start and Stop times relating to communications of a mobile device 110 between PDSN 220 and network 140 (3G) or SGW 250 and PGW 270 (4G) may be obtained from the Pi or S5 interfaces, respectively. The IP address assigned to a mobile device 110 (Device IP Address) may be obtained from a number of possible interfaces, including: A11, S1U, S5, S11, and Pi. A number of other parameters may be obtained from this set of interfaces (A11, S1U, S5, S11, and Pi), including: a protocol type, protocol name, a dormancy status of a mobile device 110 (Device Dormancy Status), the amount of time a mobile device is in a dormancy state (Dormancy Time), a protocol transport type, a cell site type, sector information relating to a cell site (Cell Site Sectors), status information relating to cell site sectors (Cell Site Sector Status), carrier frequency (Frequency Carrier), and a congestion level of the network (Congestion Level). For 3G network 120, a home agent (HA) and PDSN may be obtained from the Pi interface. For 4G network 130, the MME, SGW, and PGW may be obtained from the S5 and/or S11 interface.

The fields "Other NEs" and "Open Field Type N" (where N is an integer), are also shown in Table I, and may represent additional fields that may be obtained from the interfaces in 3G network 120 and/or 4G network 130. These fields may thus represent customizable parameters fields. In general, any information that is obtainable by network probe 280 may be included. The parameters obtained by network probe 280 may be, for example, configured by a network administrator or another party.

Figure 5:
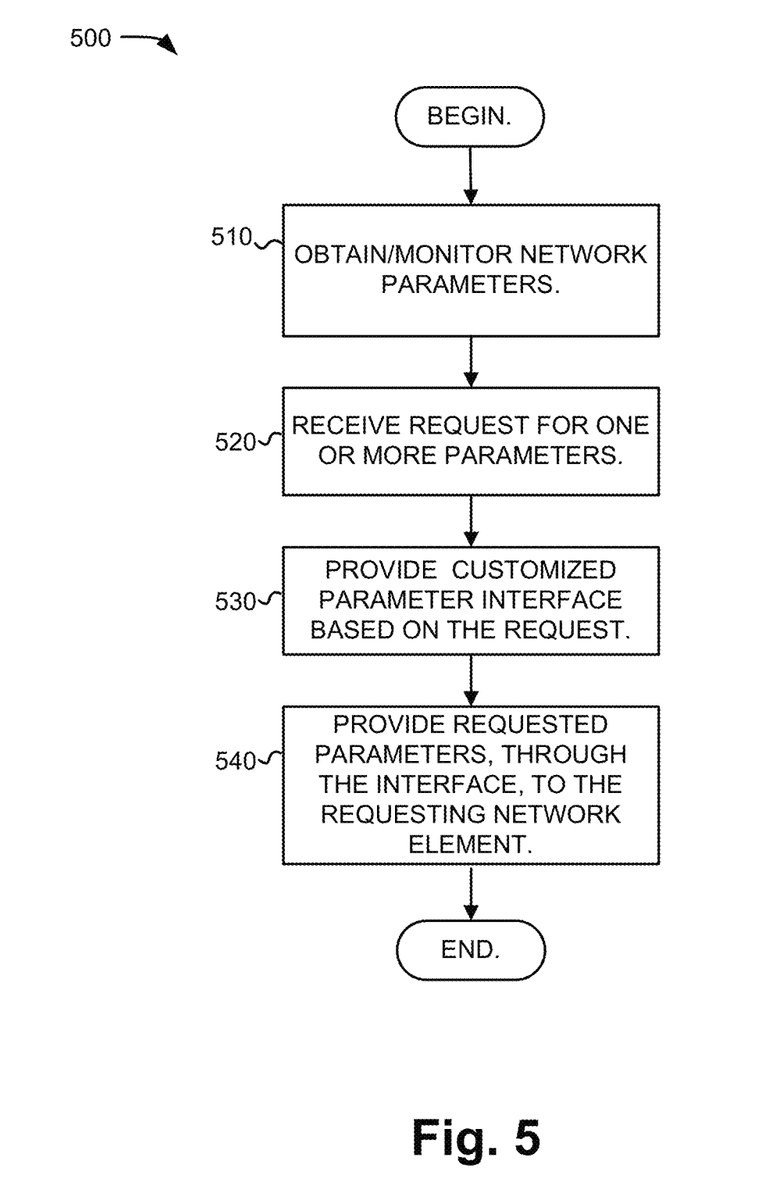
FIG. 5 is a flow chart illustrating an example process for providing a generic interface to requesting network elements.

FIG. 5 is a flow chart illustrating an example process 500 for providing a generic interface to requesting network elements. In one implementation, process 500 may be performed by network probe 280, generic interface component 290, and/or a combination of network probe 280 and generic interface component 290. As previously mentioned, in some implementations, the functionality of network probe 280 and generic interface component 290 may be combined and implemented by a single device.

Process 500 may include obtaining and/or monitoring network parameters (block 510). The monitored network parameters may include parameters, obtained from various interfaces, of 3G network 120 and/or 4G network 130. In one implementation, network probe 280, as discussed with respect to the description of FIG. 4, may obtain the network parameters. The obtained/monitored network parameters may include the parameters illustrated in Table I. When the parameters are obtained by network probe 280, the parameters may be forwarded to or read by generic interface component 290.

Process 500 may further include receiving a request for one or more network parameters (block 520). The request may be from, for example, a network element in 3G network 120, 4G network 130, IP network 140, or from another network. The request may specify a list of parameters in which the network element is interested. In this manner, the requesting network element can specify a custom interface of parameters.

Process 500 may further include providing a customized parameter interface based on the request received in block 520 (block 530). In one implementation, generic interface component 290 may, for example, stream information updating the requested parameters to the requesting network element. In another possible implementation, the requesting network element may query generic interface component 290 to receive a data structure containing the requested parameters. In general, a number of potential techniques could be used to present an interface to the requesting network element that includes the parameters/fields requested by the network element.

Process 500 may further include providing the requested parameters, through the interface, to the requesting network element (block 540). In this manner, a custom set of parameters, potentially covering both 3G network 120 and 4G network 130, can be provided to a requesting network element.

Figure 6:
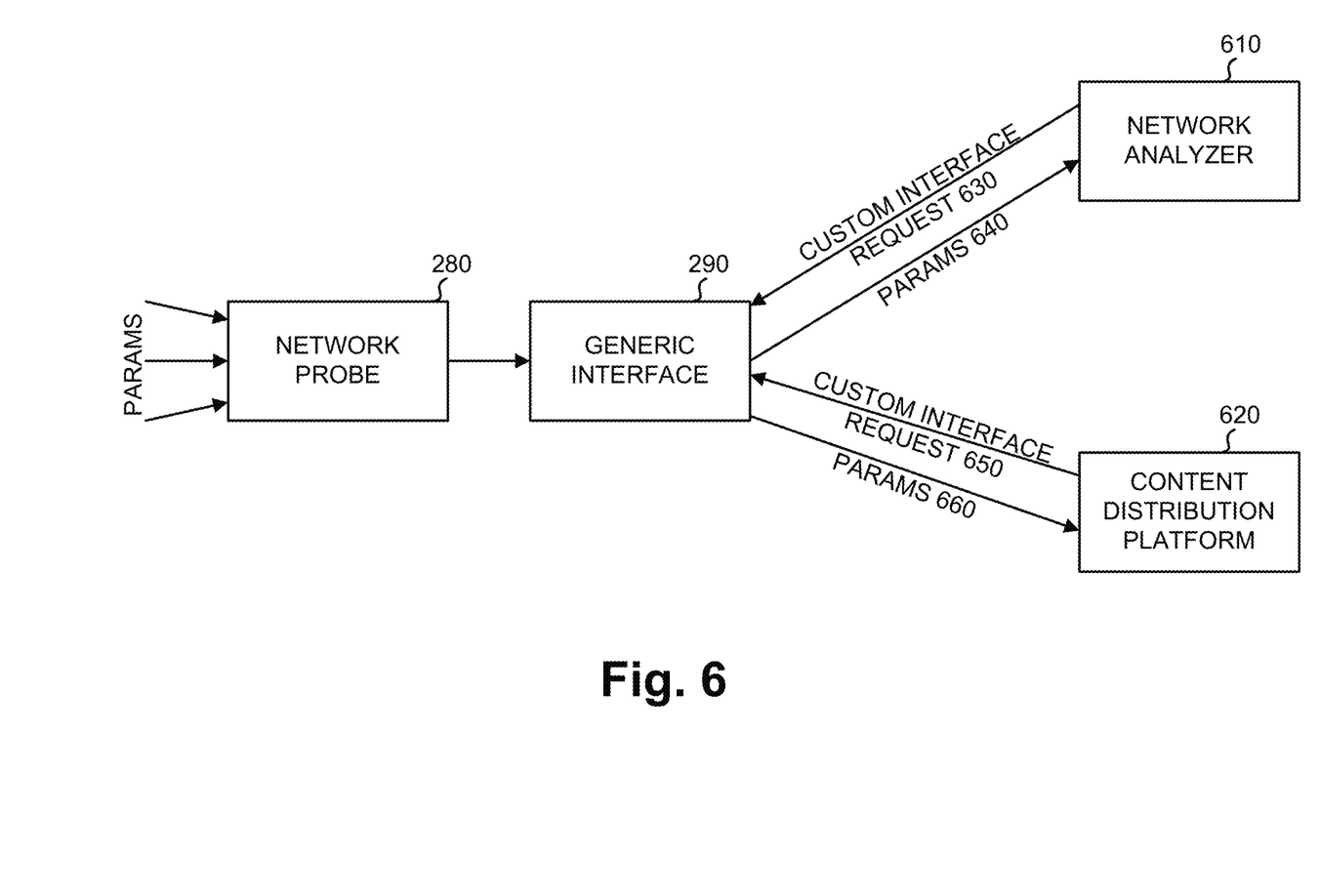
FIG. 6 is a diagram illustrating an example application of the techniques discussed with respect to FIG. 5.

FIG. 6 is a diagram illustrating an example application of the techniques discussed with respect to process 500. As illustrated, network probe 280 may connect to various interfaces in 3G network 120 and 4G network 130 to gather information (PARAMS) relating to mobile devices 110 and/or 3G/4G networks 120/130. The gathered information may include, for example, parameters corresponding to the fields given in Table I. Generic interface component 290 may receive the gathered information from network probe 280.

Two network elements are additionally illustrated in FIG. 6: a network analyzer 610 and a content distribution platform 620. Network analyzer 610 may include one or more devices that operate to analyze the performance of 3G network 120 and/or 4G network 130. Based on the analysis, network analyzer 610 may control network devices in networks 120/130 to optimize the operation of the networks. To perform the network analysis, network analyzer 610 may require a subset of the parameters shown in Table I. For example, network analyzer 610 may only manage 3G network 120, in which case, network analyzer may only request parameters relating to 3G network 120. As another example, network analyzer 610 may be designed to optimize traffic flow in both 3G/4G networks 120/130. In this case, network analyzer 610 may request parameters relating to the traffic flow in both 3G/4G networks 120/130.

At some point, network analyzer 610 may request the creation of a custom interface that includes the parameters required by network analyzer 610. For example, as illustrated in FIG. 6, a custom interface request message 630 may be sent to generic interface component 290. Custom interface request message 630 may include a list of the parameters needed by network analyzer 610 (see block 520, FIG. 5). In response, generic interface component 290 may create the corresponding interface, including the requested parameters (see block 530, FIG. 5). The parameters (PARAMS 640) needed by network analyzer 610 may then be received through the interface. In an alternative possible implementation, the interface created for network analyzer 610 may be created by a network device other than network analyzer 610. For example, a network administrator may manually determine and setup the interface, such as by sending a message similar to custom interface request message 630.

Figure 7A:
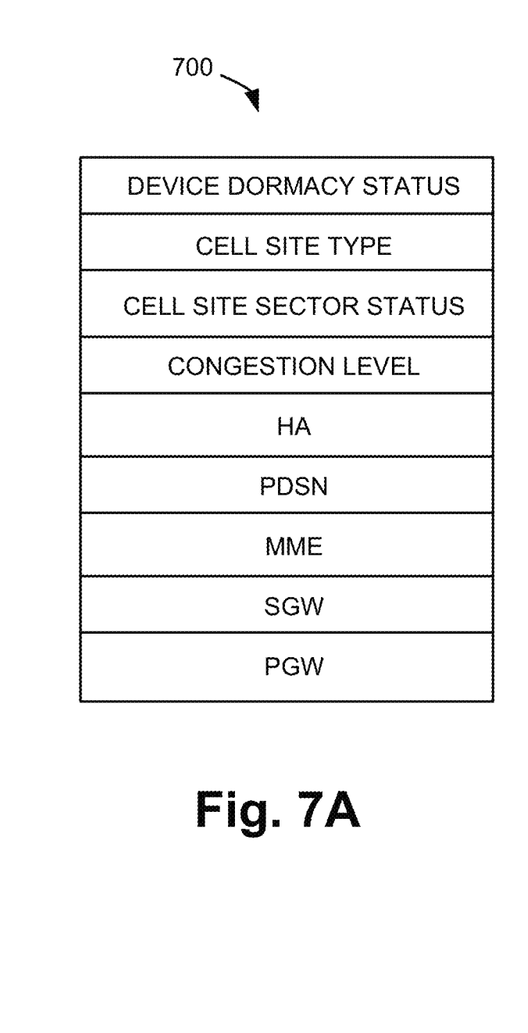
FIG. 7A is a diagram illustrating an example set of parameters that may be requested by a network analyzer in requesting a custom interface.

FIG. 7A is a diagram illustrating an example set of parameters 700 that may be requested by network analyzer 610 in requesting a custom interface. Parameters 700 may include parameters that may be useful to the operation of network analyzer 610, such as, for example, the Device Dormancy Status, Cell Site Type, Cell Site Sector Status, Congestion Level, MA, PDSN, MME, SGW, and PGW parameters.

Content distribution platform 620 may include one or more devices that operate to distribute content, such as video streams, to mobile devices 110, over 3G network 120 and/or 4G network 130. It may be desirable for content distribution platform 620 to analyze 3G network 120 and/or 4G network 130 to optimize the delivery of content. To perform the analysis, content distribution platform 620 may require a subset of the parameters shown in Table I.

At some point, content distribution platform 620 may request the creation of a custom interface that includes the parameters required by content distribution platform 620. For example, as illustrated in FIG. 6, a custom interface request message 650 may be sent to generic interface component 290. Custom interface request message 650 may include a list of the parameters needed by content distribution platform 620 (see block 520, FIG. 5). In response, generic interface component 290 may create the corresponding interface, including the requested parameters (see block 530, FIG. 5). The parameters (PARAMS 660) needed by content distribution platform 620 may then be received through the interface.

Figure 7B:
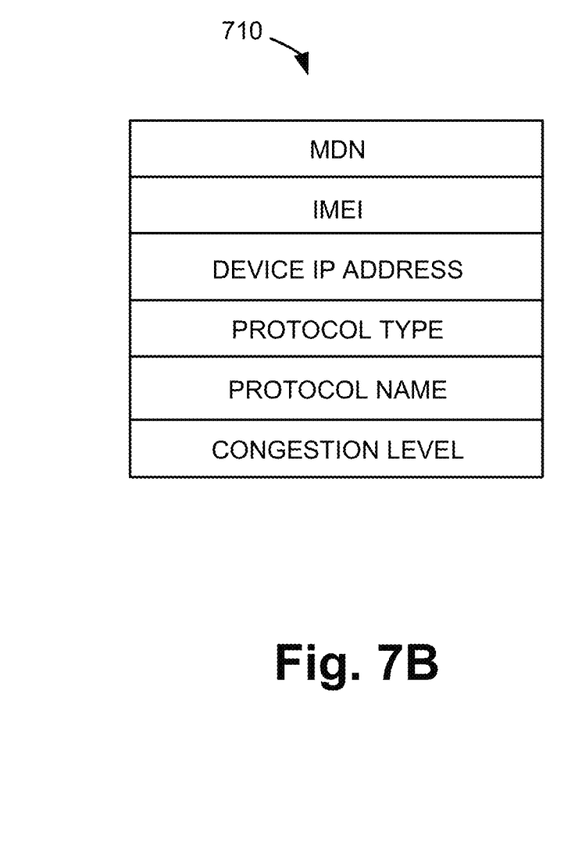
FIG. 7B is a diagram illustrating an example set of parameters that may be requested by a content distribution platform in requesting a custom interface.

FIG. 7B is a diagram illustrating an example set of parameters 710 that may be requested by content distribution platform 620 in requesting a custom interface. Parameters 710 may include parameters that may be useful to the operation of content distribution platform 620, such as, for example, the MDN, IMEI, Device IP Address, Protocol Type, Protocol Name, and Congestion Level parameters.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more devices, the method comprising:
   simultaneously monitoring, by the one or more devices, parameters relating to a $3^{rd}$ generation (3G) wireless network and a $4^{th}$ generation (4G) wireless network;
   receiving, by the one or more devices, a request, from a network element, to create a first custom software interface, between the one or more devices and the network element, for the parameters relating to operation of the 3G wireless network and operation of the 4G wireless network, the request including an indication of a first subset of the parameters that are to be included in the first custom software interface;
   providing, by the one or more devices, the first custom software interface to the network element by providing a data structure that includes the first subset of the parameters;
   receiving a second request, from a second network element, to create a second custom software interface, the second request including an indication of a second subset of the parameters, different from the first subset of the parameters, that are to be included in the second custom software interface; and
   providing, to the second network element, the second custom software interface by providing a second data structure that includes the second subset of the parameters,
   wherein the one or more devices include devices other than user mobile devices for the 3G wireless network or the 4G wireless network.

2. The method of claim 1, where the parameters are monitored through interfaces in the 3G wireless network and the 4G wireless network.

3. The method of claim 2, where the interfaces include a 4G S5, S11, or S1U interface.

4. The method of claim 2, where the interfaces include a 3G A11 or Pi interface.

5. The method of claim 1, where the request includes a list of parameters to be provided to the network element.

6. The method of claim 1, where providing the first custom software interface includes:
   streaming the data structure to provide information relating to the first subset of parameters to the network element.

7. The method of claim 1, where the network element includes a network analysis component or a network optimization component.

8. The method of claim 1, where the first subset of parameters includes parameters from the 3G wireless network and parameters from the 4G wireless network.

9. A device comprising:
   a processor; and
   a memory to store programming instructions that, when executed by the processor, cause the processor to:
   simultaneously monitor parameters relating to operation of a $3^{rd}$ generation (3G) wireless network and operation of a $4^{th}$ generation (4G) wireless network,
   receive a request, from a network element, to create a custom software interface, between the device and the network element, for the parameters relating to the 3G wireless network and the 4G wireless network, the request including an indication of a subset of the parameters that are to be included in the custom software interface,
   provide, to the network element, the custom software interface to the network element by providing a data structure that includes the subset of the parameters,
   receive a second request, from a second network element, to create a second custom software interface, the second request including an indication of a second subset of the parameters, different from the subset of the parameters, that are to be included in the second custom software interface, and
   provide, to the second network element, the second custom software interface by providing a second data structure that includes the second subset of the parameters,
   wherein the device is a device other than a user mobile device for the 3G wireless network or the 4G wireless network.

10. The device of claim 9, where the parameters are monitored through interfaces in the 3G wireless network and the 4G wireless network.

11. The device of claim 9, where the interfaces include a 4G S5, S11, or S1U interface.

12. The device of claim 10, where the interfaces include a 3G A11 or Pi interface.

13. The device of claim 9, where the request includes a list of parameters desired by the network element.

14. The device of claim 9, where the subset of parameters includes parameters from the 3G wireless network and parameters from the 4G wireless network.

15. A non-transitory computer-readable medium containing programming instructions, for execution by one or more processors, the medium comprising one or more instructions to:
   simultaneously determine parameters relating to operation of a $3^{rd}$ generation (3G) wireless network and operation of a $4^{th}$ generation (4G) wireless network;
   receive, a request, from a network element, to create a software custom interface, between devices associated with the one or more processors and the network element, for the parameters relating to the 3G wireless network and the 4G wireless network, the request including an indication of a subset of the parameters that are to be included in the custom interface; and
   provide, to the network element, the custom software interface to the network element by providing a data structure that includes the subset of the parameters,
   receive a second request, from a second network element, to create a second custom software interface, the second request including an indication of a second subset of the parameters, different from the first subset of the parameters, that are to be included in the second custom software interface, and
   provide, to the second network element, the second custom software interface by providing a second data structure that includes the second subset of the parameters,
   wherein the devices associated with the one or more processors include devices other than user mobile devices for the 3G wireless network or the 4G wireless network.

16. The non-transitory computer-readable medium of claim 15, where the parameters are monitored through interfaces in the 3G wireless network and the 4G wireless network.

17. The non-transitory computer-readable medium of claim 15, where the subset of parameters includes parameters from the 3G wireless network and parameters from the 4G wireless network.

\* \* \* \* \*